(12) United States Patent
Wiedeman et al.

(10) Patent No.: US 6,629,729 B2
(45) Date of Patent: Oct. 7, 2003

(54) REAR SEAT FOR A VEHICLE

(75) Inventors: Michael Wiedeman, Manhattan Beach, CA (US); Michael Tsay, Irvine, CA (US); Mami Endo, Redondo Beach, CA (US); John Dixon, Redondo Beach, CA (US); John A. Frye, San Pedro, CA (US); Frank D. Moburg, Whittier, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/034,479

(22) Filed: Jan. 4, 2002

(65) Prior Publication Data

US 2003/0127891 A1 Jul. 10, 2003

(51) Int. Cl.⁷ .................................................. A47C 15/00
(52) U.S. Cl. ...................... 297/232; 297/14; 297/335; 297/331; 297/311; 297/344.21; 297/378.1; 297/248; 296/65.09
(58) Field of Search ................................. 297/331, 335, 297/344.21, 378.1, 325, 326, 452.56, 232, 13, 14, 410, 378.12, 245, 248; 296/65.11, 65.09

(56) References Cited

U.S. PATENT DOCUMENTS

| 501,896 | A | * | 7/1893 | McAneny et al. | 297/13 |
| 656,583 | A | * | 8/1900 | Levin | 297/13 |
| 1,321,009 | A | * | 11/1919 | Carlson | 297/236 |
| 4,211,450 | A | * | 7/1980 | Sutter | 297/232 |
| 4,740,030 | A | * | 4/1988 | Nordskog | 297/13 |
| 4,883,320 | A | * | 11/1989 | Izumida et al. | 297/452.56 |
| 5,116,097 | A | * | 5/1992 | Bulgari | 296/64 |
| 5,328,231 | A | * | 7/1994 | Raymond | 297/13 |
| 5,335,963 | A | * | 8/1994 | Muller et al. | 297/244 |
| 5,378,040 | A | * | 1/1995 | Chaney et al. | 297/338 |
| 5,489,141 | A | * | 2/1996 | Strausbaugh et al. | 297/335 |
| 5,492,068 | A | * | 2/1996 | McKee | 108/44 |
| 5,707,103 | A | * | 1/1998 | Balk | 297/13 |
| 5,984,397 | A | * | 11/1999 | Dawson et al. | 296/65.09 |
| 6,070,939 | A | * | 6/2000 | Matsuo et al. | 297/378.12 |
| 6,073,986 | A | * | 6/2000 | Neale et al. | 296/63 |
| 6,270,140 | B1 | * | 8/2001 | Opfer et al. | 296/65.03 |
| 6,343,834 | B1 | * | 2/2002 | Wurmlinger | 297/14 |
| 6,460,922 | B1 | * | 10/2002 | Demick | 297/14 |
| 6,460,929 | B2 | * | 10/2002 | Kamida | 297/344.1 |

* cited by examiner

*Primary Examiner*—Peter M. Cuomo
*Assistant Examiner*—Stephanie Harris
(74) *Attorney, Agent, or Firm*—Armstrong, Westerman & Hattori, LLP; Mark E. Duell (57) ABSTRACT

A pair of foldable rear seats for a motor vehicle includes a support stub fixed to the vehicle and a pair elongated support arms pivotally connected to the support stub. A pair of seat bottoms are pivotally connected to each of the respective support arms, such that each seat bottom is pivotable between a vertical folded position and a horizontal open position. Further, a pair of seat backs are each pivotally connected to a rear portion of each respective seat bottom in order to fold into the respective seat bottom from an open position. A headrest is slidably disposed on each seat back. Furthermore, a pair of seat legs are each pivotally connected to the seat bottom at an outer portion thereof so that when the seat bottom is in the open state, the seat leg, in its open position, extends from the seat bottom to the vehicle floor.

21 Claims, 14 Drawing Sheets

REAR SEAT FOR A VEHICLE

BACKGROUND OF THE INVENTION

1. Field of the Invention

The instant invention is directed to seats for a vehicle. More specifically, it is directed to foldable rear seats for use in a motor vehicle.

2. Description of the Related Art

In many sporting vehicles, rear seats have been designed to fold up in order to increase cargo carrying capacity in the vehicle. In some cases complete rear seats fold down, and some cases the seats are split. Seats may be split in a 50/50 arrangement or a 60/40 arrangement. Often when rear seats fold down, the seat bottom, hinged at its lower forward portion, folds forward and the seat back, hinged at the lower portion thereof, also folds forward to have a flat, or sometimes not so flat, cargo area.

When conventional rear seats are folded forward, as described above, sometimes they do not, in fact, provide a flat cargo area. Furthermore, often when dirty cargo is carried, the seats which are folded away have also become dirty from the cargo.

These and other problems described above have been overcome by the rear seats in accordance with the instant invention, as described below.

SUMMARY OF THE INVENTION

The seats in accordance with the instant invention are generally for use in a sporting vehicle and may be described as action seats. In the present market, many vehicles are tailored for active buyers. Such active buyers are taking part in activities such as mountain biking, hiking, camping, and many other activities that require hauling equipment, bicycles, and other bulky activity related items. Thus, the action seats, in accordance with the instant invention, provide a great deal of flexibility for different configurations of seating and cargo carrying arrangements.

The subject seats enable three different seating/cargo configurations to be obtained. An open state allows the seats to be used by passengers. In the open state, the seats are angled slightly outwardly with regard to the centerline of the vehicle, in order to allow passengers to more easily view the outside of the car rather than just the seat backs ahead of them. This reduces the claustrophobic type of feelings that passengers may have. The seats have mesh-like fabric inserts in order to allow greater air flow and thus to enable more comfort for the occupants. Further, the construction of these seats enable them to be very light weight and easy to move. That means that they are easy to fold up into a folded state or to open into the open state. This is in contrast to many automobile seats which are very heavy and, thus, very difficult to fold up or to open.

In the first folded state (or central stowed position), the outer shells of the seat bottoms close up to form a clam-shell type of protection for the seats folded up therein. This clam-shell protection helps the seats themselves to stay cleaner and free of damage due to cargo carried in the rear portion of the vehicle.

Therefore, a foldable rear seat for a vehicle in accordance with the instant invention includes a support stub fixed to the vehicle and an elongated support arm pivotable about the support stub and having a second end, remote from the first end. A seat bottom is operatively connected to and pivotable about the second end of the support arm so that the seat bottom is pivotable between a vertical folded position and a horizontal open position. Furthermore, a seat back is operatively connected to the seat bottom and is pivotable about an axis at a rear portion of the seat bottom in order to easily fold into the seat bottom. Thus, the rear seat described above is easily configurable into an open state for use as a seat, and two folded states. The first folded state is one in which the seat bottoms are folded up into a folded state and are disposed next to one another in a central stowed position. The second folded state provides for the individual folded seat to be stowed laterally with respect to the centerline of the vehicle.

The seats in accordance with the instant invention work together best as a pair. When paired up with one another, in the first folded state, the outer shell of each seat cooperates together to form a clam-shell type structure that protects the folded up seats inside.

DETAILED DESCRIPTION OF THE INVENTION

Figure 1:
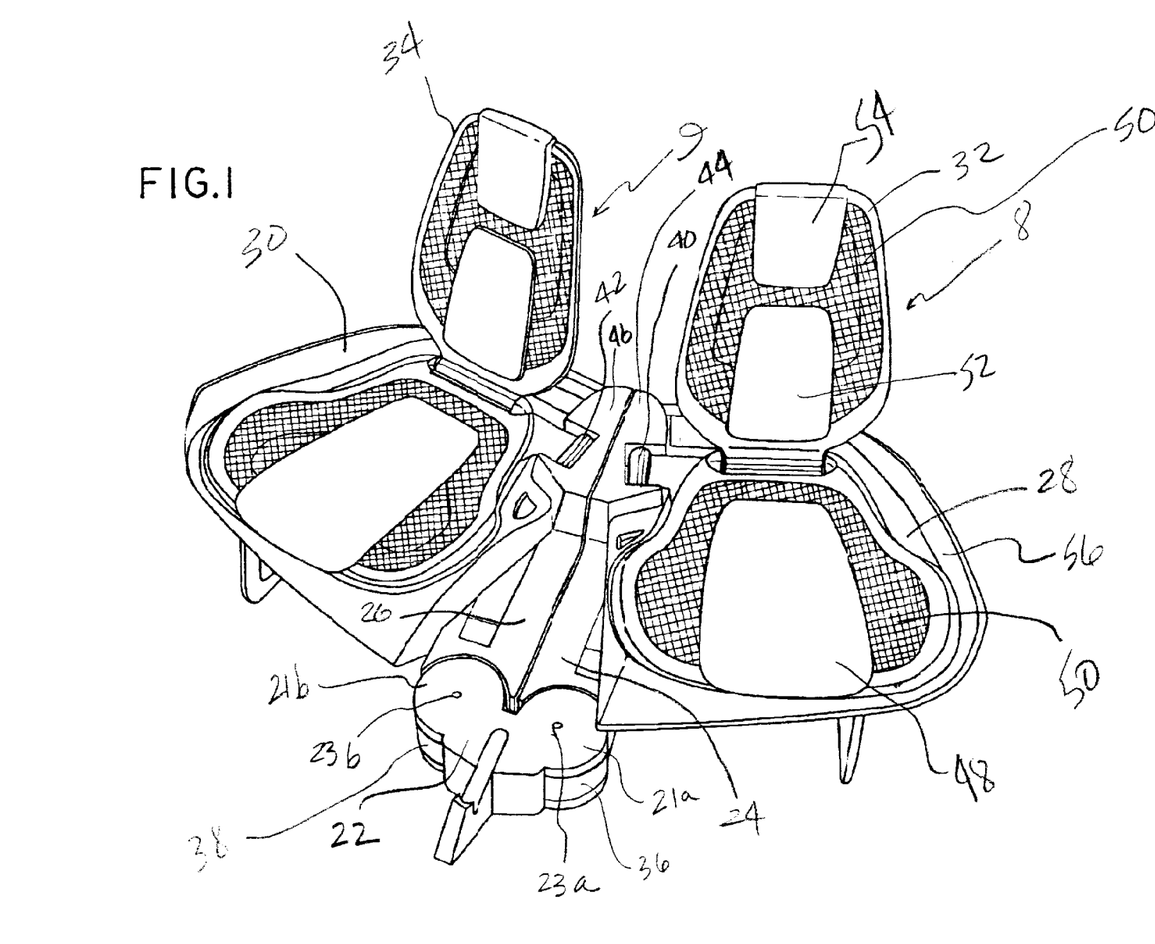
FIG. 1 is a front view of a pair of seats in accordance with the instant invention.
Figure 2:
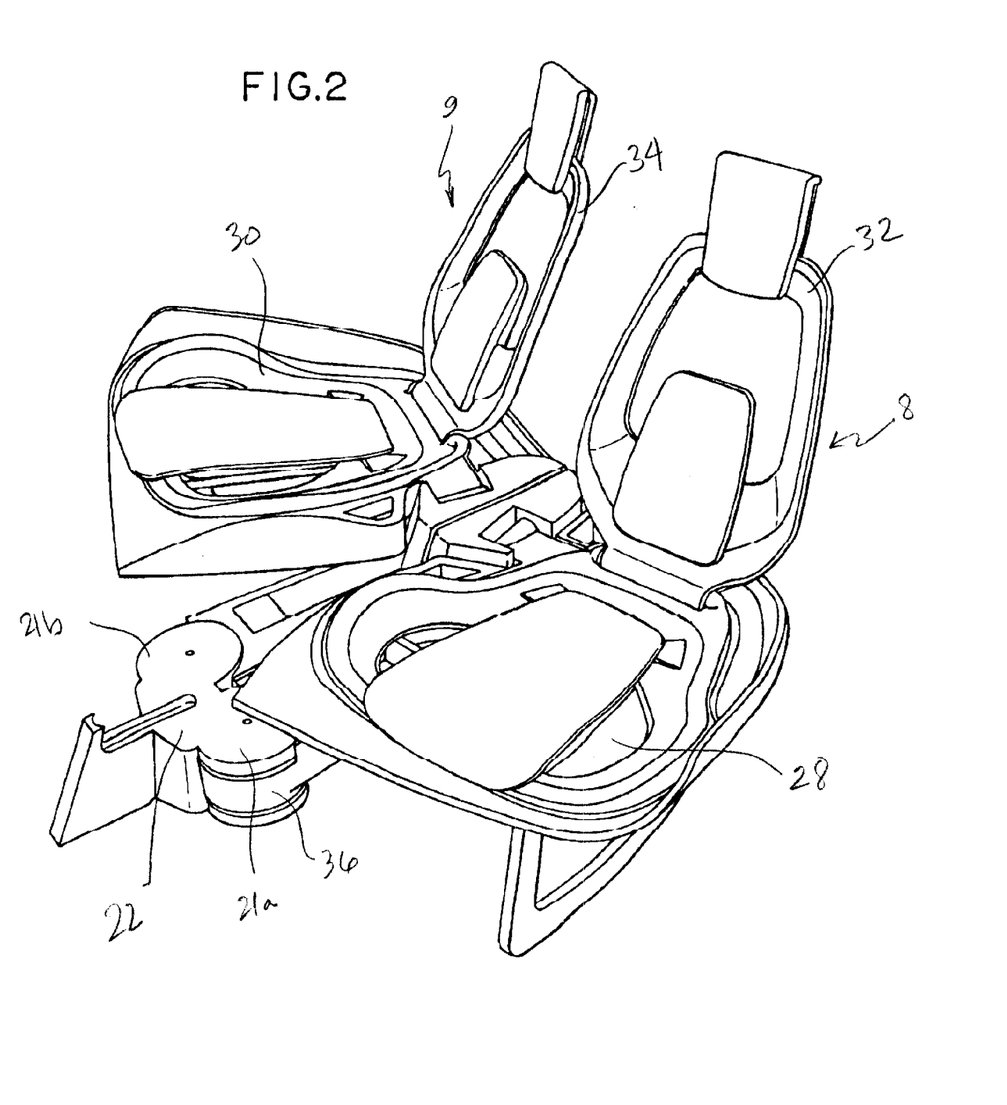
FIG. 2 is a front perspective view of the seats of FIG. 1.
Figure 3:
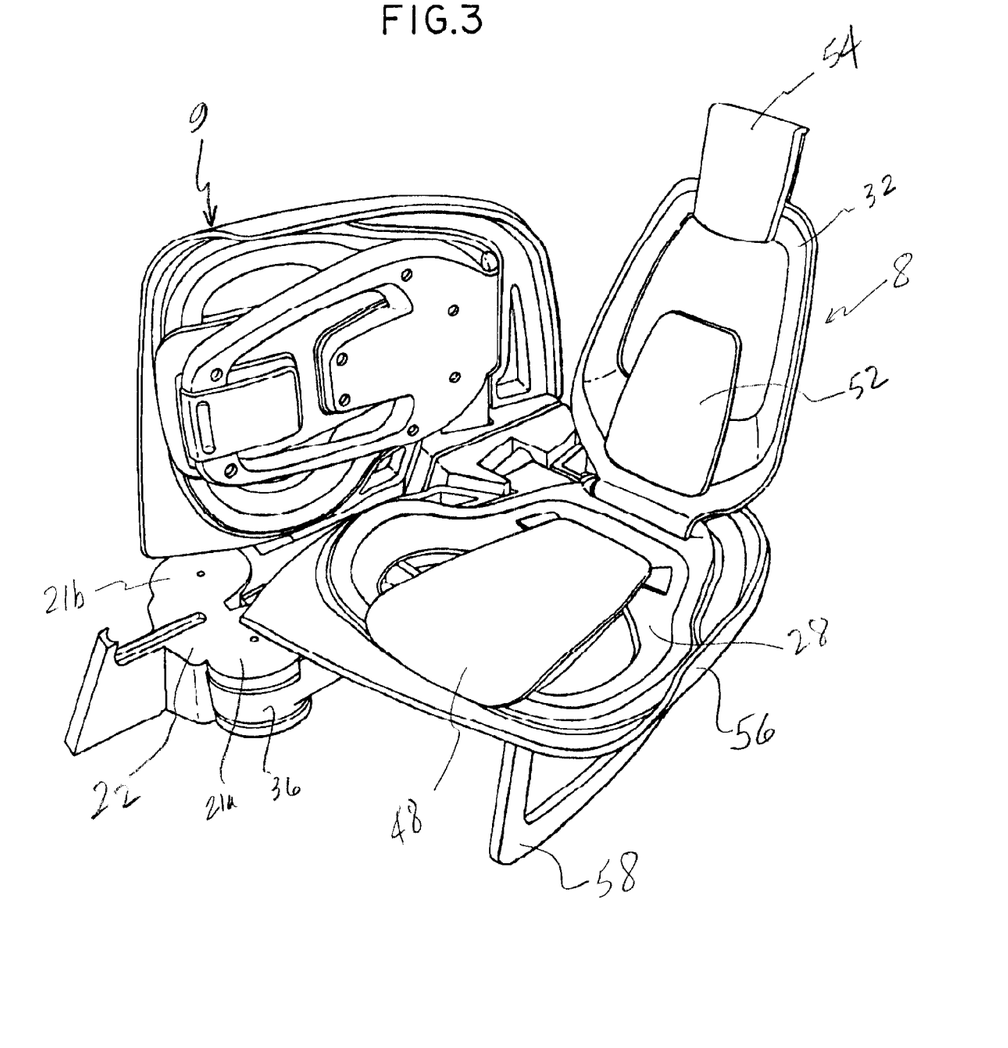
FIG. 3 illustrates the pair of seats in which the right seat is in the folded state.

FIG. 1 illustrates a pair of seats in accordance with the instant invention. Left and right seats 8 and 9 are illustrated in accordance with the instant invention. Support stub 22 is fixed to the floor of the vehicle or linked to the central pillar 20 (see FIG. 14A). Support stub 22 has hinged plates 21*a* and 21*b* formed therein. Left and right elongated support arms 24 and 26 include respective left and right hinges 36 and 38. Left and right hinges 36 and 38 cooperated with left and right hinged plates 21*a* and 21*b* of support stub 22. Thus, left and right elongated support arms 24 and 26 pivot about pivot pins 23*a* and 23*b*, respectively. The cooperative operation of left and right hinges 36 and 38 along with the pivot pins 23*a* and 23*b* and hinged plates 21*a* and 21*b* enable support arms 24 and 26 to pivot outwardly approximately 90° each. In other words, support arms 24 and 26 are pivotable between the position shown (central stowage position) and a position lateral (butterfly position) with respect to the vehicle (see FIG. 14A). As further illustrated in FIG. 1, left and right seats 8 and 9 include left and right seat bottoms 28 and 30, and left and right seat backs 32 and 34. Left and right seat bottom pivots 40 and 42 are formed at the second ends 44 and 46 of support arms 24 and 26. The second ends 44 and 46 are spaced apart from the pivot ends of support arms 24 and 26. While the complete structure of seats 8 and 9 will be described below, it is also illustrated in FIG. 1 that seat bottom 28 includes a cushion layer for 48 on top of a layer of mesh-like fabric 50. The mesh-like fabric 50 is intended to include any type of open fabric which provides for enhanced air flow therethrough. The use of this fabric increases the comfort for the seat occupants. Seat back 32 includes a seat back cushion 52 and a headrest 54 on top of mesh-like fabric 50. Seat bottom 28 also includes an outer shell 56. The components of right seat bottom 30 and right seat back 34 are similar to those of left seat bottom 28 and left seat back 32.

Figure 8:
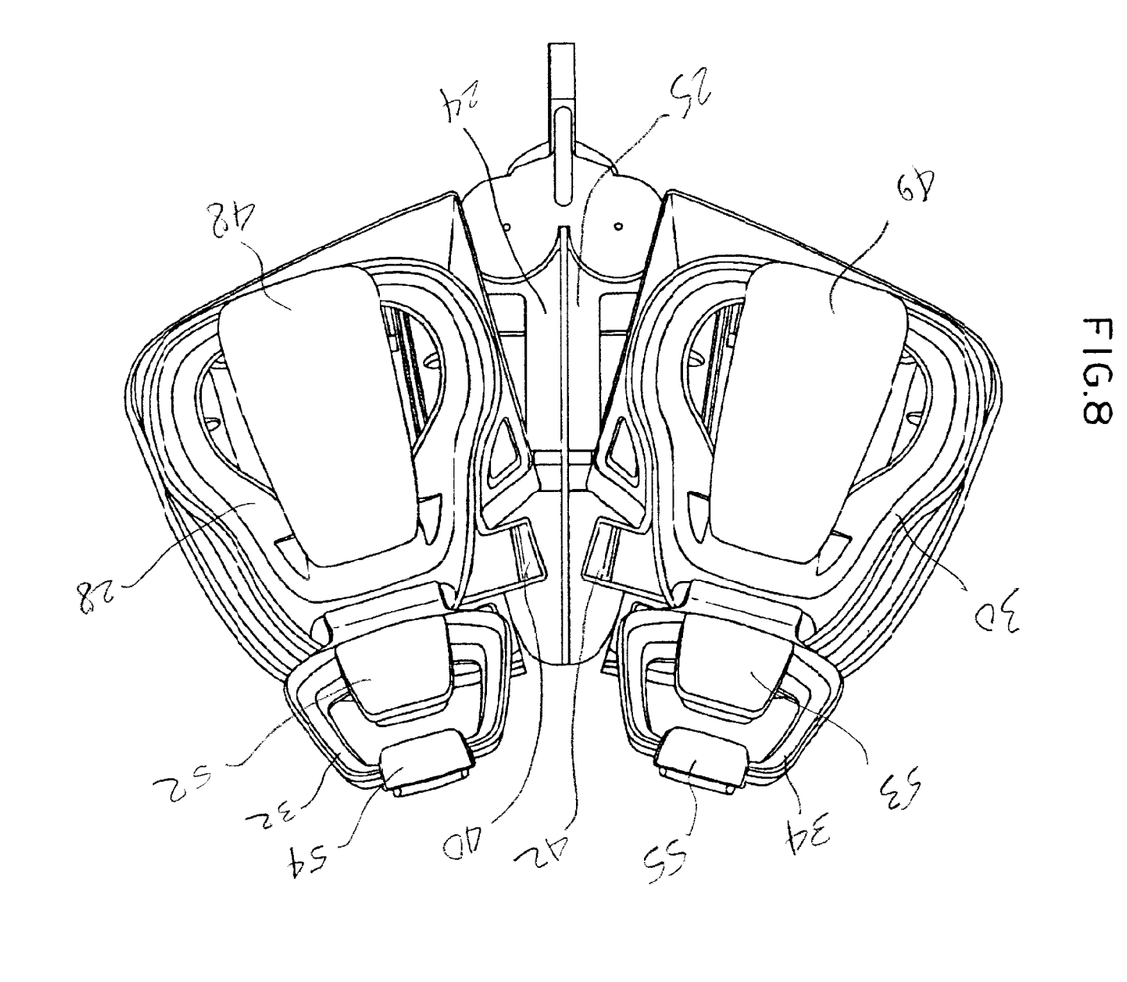
FIG. 8 illustrates a top plan view of the seats.

As also illustrated in FIG. 1, seats 8 and 9 are not facing directly forward. In fact, each seat faces at an angle slightly outwardly, in order to turn the passenger's view more toward the outside of the vehicle than the inside. For example, left seat bottom pivot 40 has an axis slightly offset from a center axis of support arm 24. This angle is also illustrated in FIG. 8. While it is not necessary that the rear seats be angled, it is preferable for 6, them to be angled. So, while the seats may be straight, it is preferable that they be angled outwardly from the vehicle centerline in a range of 10° to 22° degrees, and even more preferable to be angled outwardly at about 16°. An added advantage of having the seats angled outwardly is an increase in foot room for the rear passengers.

Figure 4:
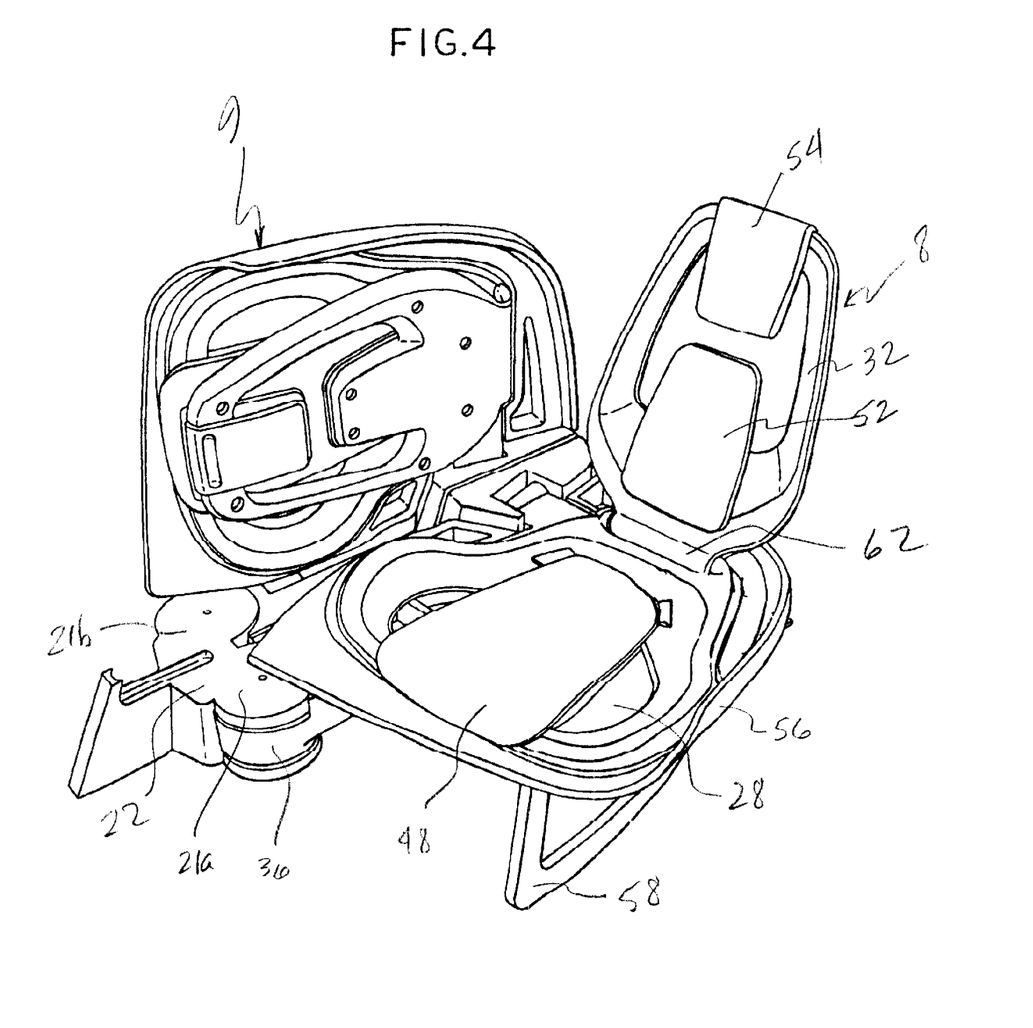
FIG. 4 illustrates the first step of folding the left seat.
Figure 5:
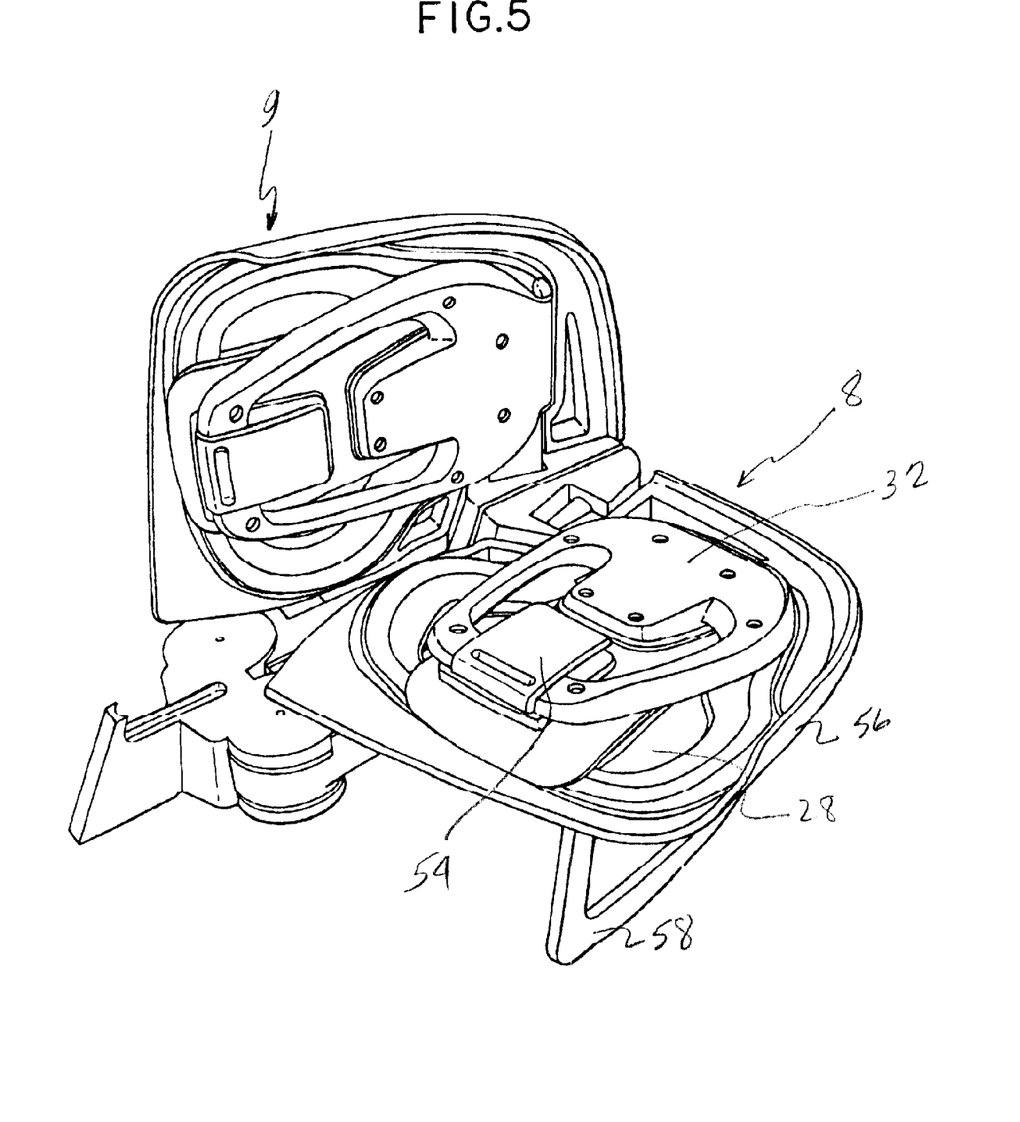
FIG. 5 illustrates the next step of folding the left seat.
Figure 6:
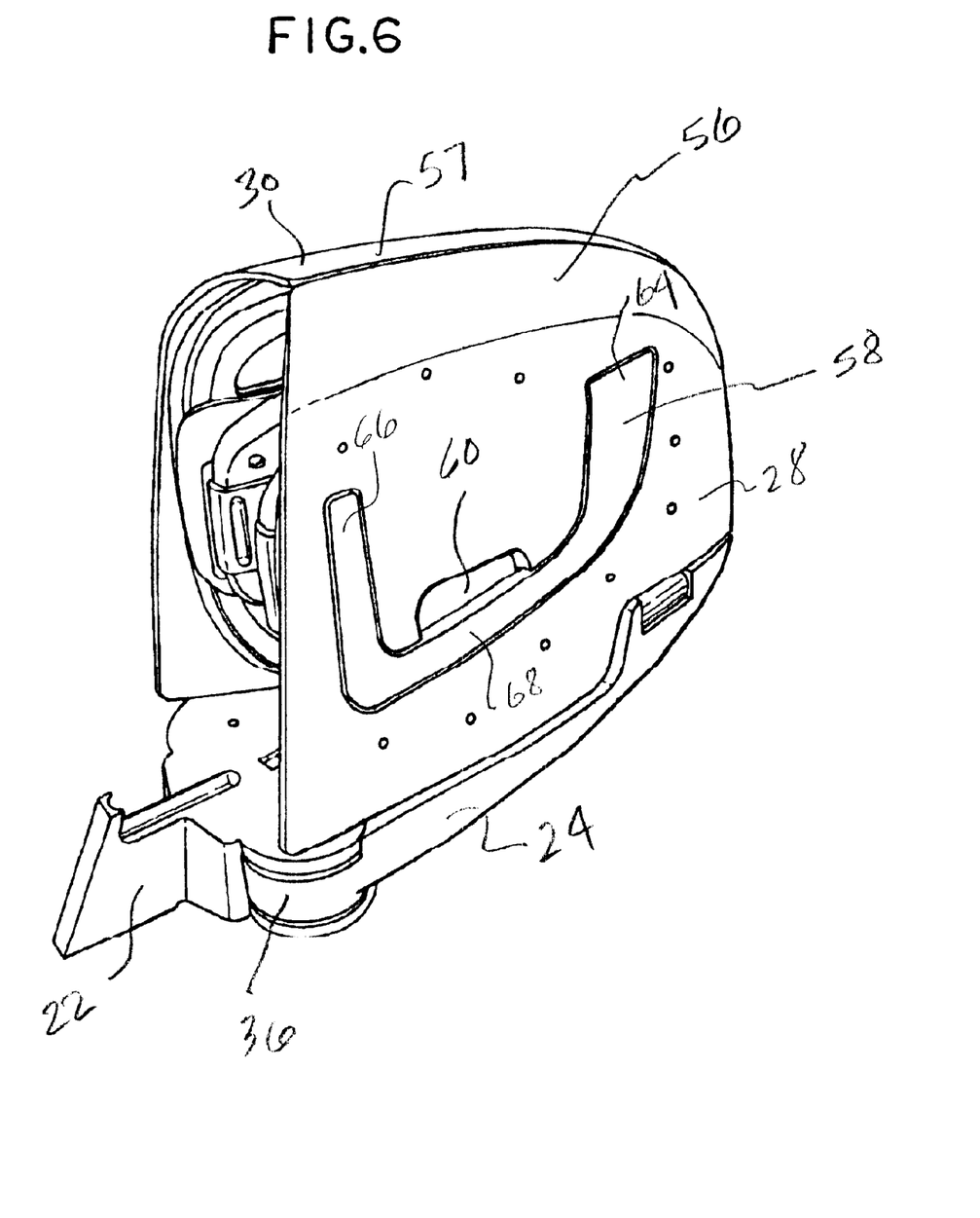
FIG. 6 illustrates the final step of folding the left seat.

FIGS. 3, 4, 5 and 6 illustrate a sequence of folding up seat 8. Seat 9 has already been folded into the first folded state which runs generally along the centerline of the vehicle. On the other hand, in FIG. 3, seat 8 is in its full open position. Note that headrest 54 is fully extended on left seat back 32 in an extended position. U-shaped seat leg 58 is in its extended position supporting seat 8 along with left seat bottom pivot 40. FIG. 4 illustrates the first step in folding up seat 8. Headrest 54 is shifted downwardly with respect to left seat back 32 into a nesting position. Once this is accomplished, the next step is illustrated in FIG. 5. In FIG. 5, left seat back 32 pivots about an axis at a rear portion of seat bottom 28 in order to fold forward into seat bottom 28. Seat bottom 28 is then pivoted about left seat bottom pivot 40 in order to be completely folded up. Once left seat bottom 28 is pivoted upward into the vertical position, seat leg 58 is then pivoted into its stowed position inside of outer shell 56. Grip opening 60 is provided inside of outer shell 56 in order to enhance the ability of the user to grip seat leg 58. Please note that seat leg 58 has two legs 64, 66 joined together by a bight 68. Legs 64 and 66 are each pivotally mounted to outer shell 56 of seat bottom 28. In the first folded state, illustrated in FIG. 6, wherein the left and right seat bottoms 28 and 30 are both folded into the vertical position generally along the axes of left and right support arms 24 and 26. These form a clam-shell-typed structure in which left outer shell 56 and right outer shell 57 join together to form a covered structure. The outer shells 56 and 57 cover the folded seats in order to prevent them from getting dirty and from being damaged by cargo. Of course, the sequence of unfolding seat. 8 is simply the reverse of the folding up sequence described above in FIGS. 3–6.

Figure 10:
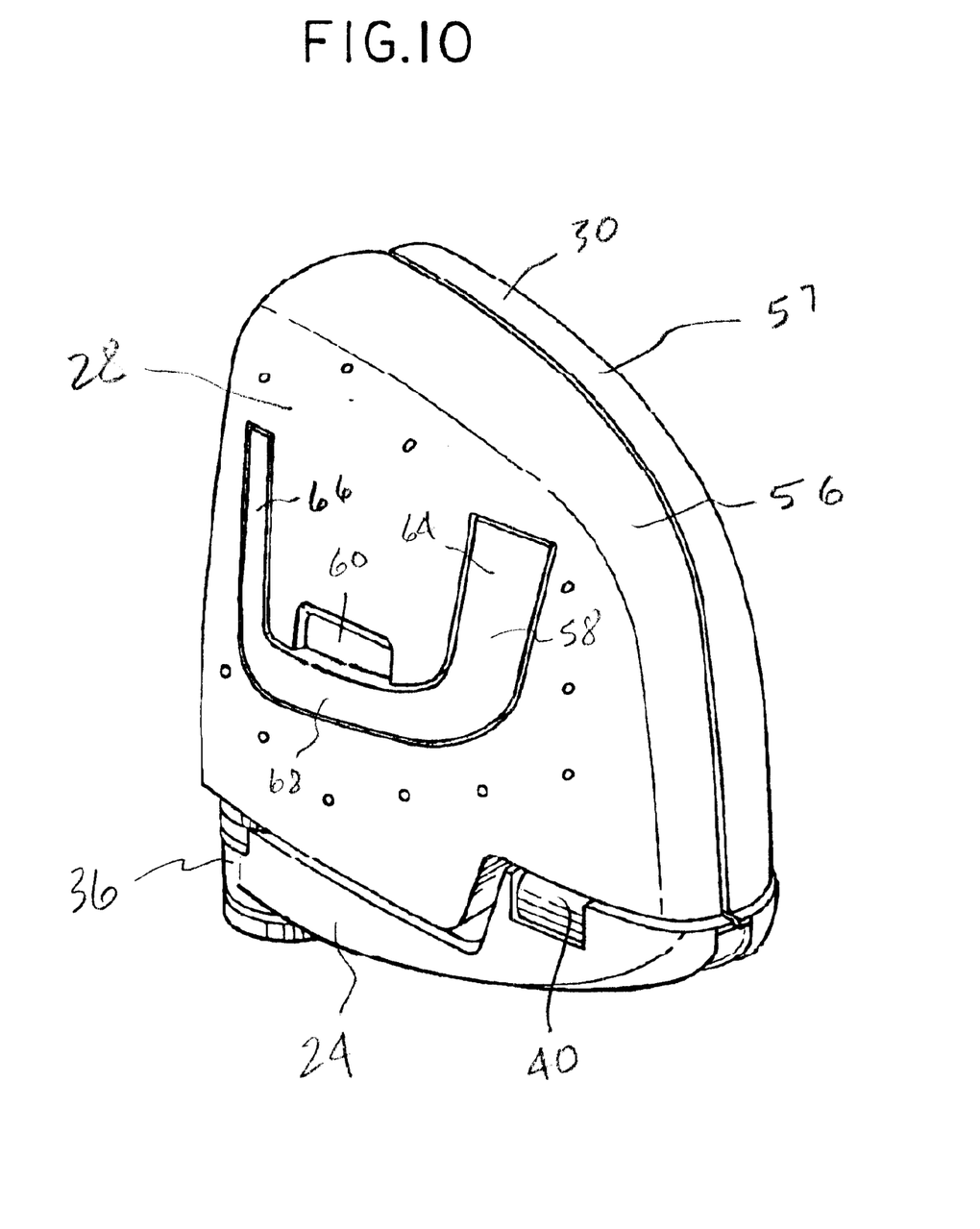
FIG. 10 illustrates the seats in the folded state in which they have a clam-shell-like structure.

FIG. 10 also illustrates the first folded state in which both left and right seats 8 and 9 are folded up together as a clam shell in order to provide a protective shell for protecting the seat. It should also be noted that When seats 8 and 9 are folded up together in the first folded state, they provide a compact unit which produces a large amount of open floor space for cargo carrying capabilities.

Figure 7:
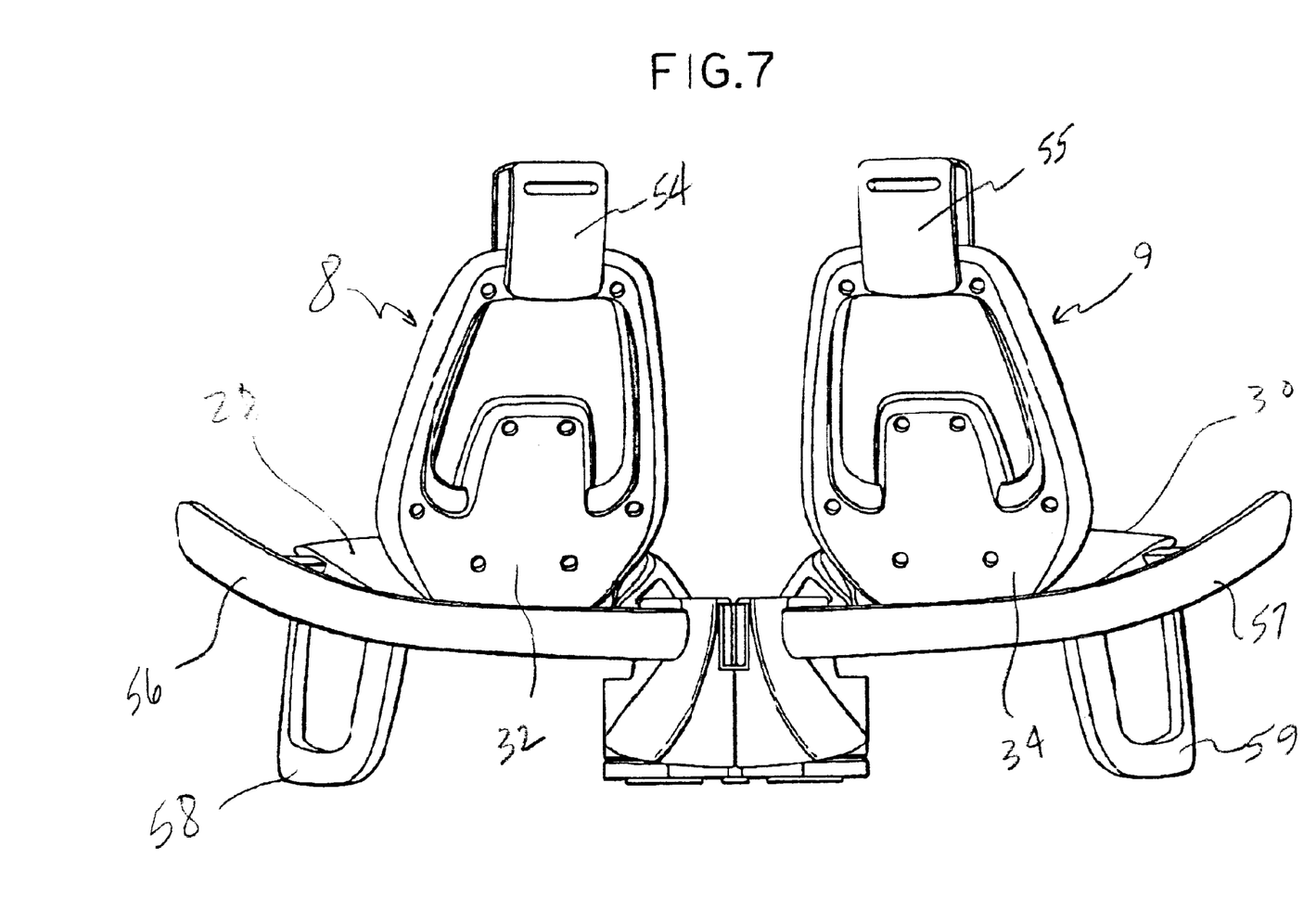
FIG. 7 illustrates the pair of seats from a rear elevational view.
Figure 9:
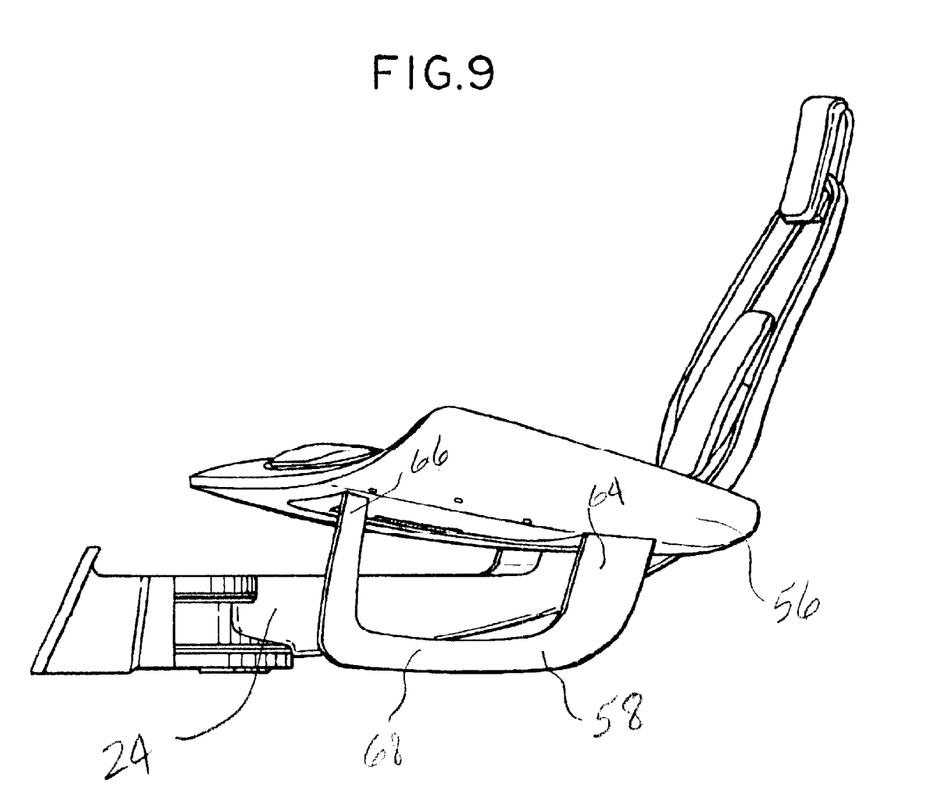
FIG. 9 illustrates a left side view of the seats.

FIGS. 7, 8 and 9 illustrate rear, top and side views of seats 8 and 9. In the rear view of FIG. 7, seats 8 and 9 are illustrated having shiftable headrests 54 and 55, respectively. Left and right outer shells 56 and 57 are illustrated as resting on left and right seat legs 58 and 59, respectively. FIG. 8 illustrates seat bottoms 28 and 30 having cushion layers 48 and 49, respectively, and seat backs 32 and 34 having seat back cushions 52 and 53, respectively and headrests 54 and 55, respective. FIG. 9 illustrates left outer shell 56, support arm 24 and left seat leg 58 extending downwardly from outer shell 56. It is clear from FIG. 9 that seat leg 58 is U-shaped and pivots downwardly from outer shell 56 at legs 64 and 66. Bight 68 rests on the floor of the vehicle to provide additional support for the seats.

Figure 11:
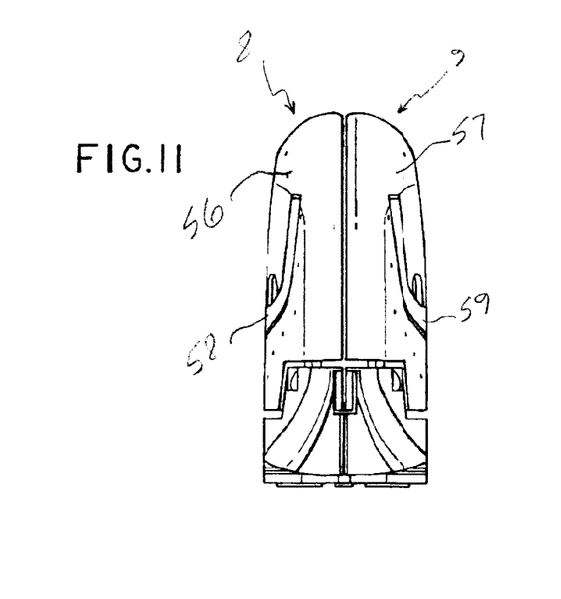
FIG. 11 illustrates the seats in the folded state from the rear.
Figure 12:
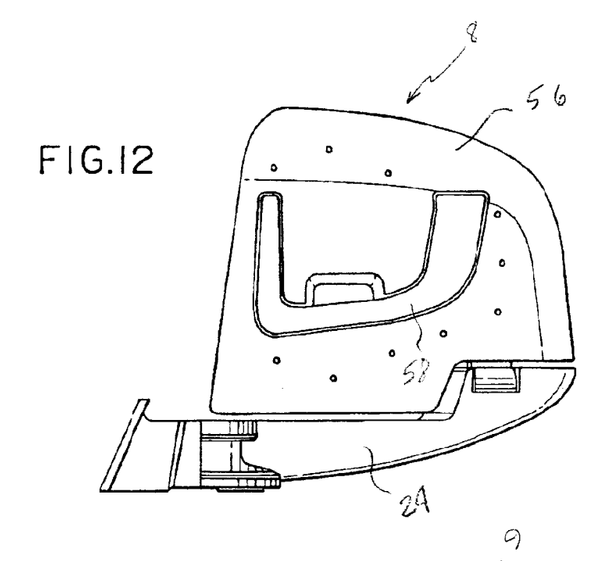
FIG. 12 illustrates the seats in the folded state from the left side.
Figure 13:
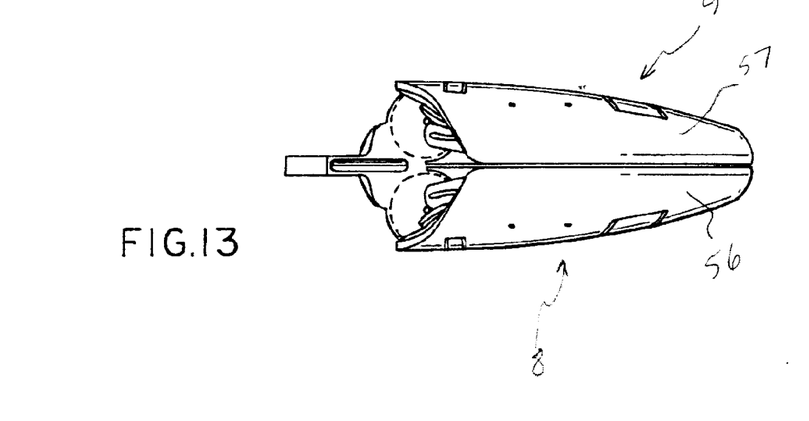
FIG. 13 illustrates the seats in the folded state from above.

FIGS. 11, 12 and 13 illustrate rear, side and top views of seats 8 and 9 in their first folded state, in which they are closed in the manner of a clam shell.

Figure 14A:
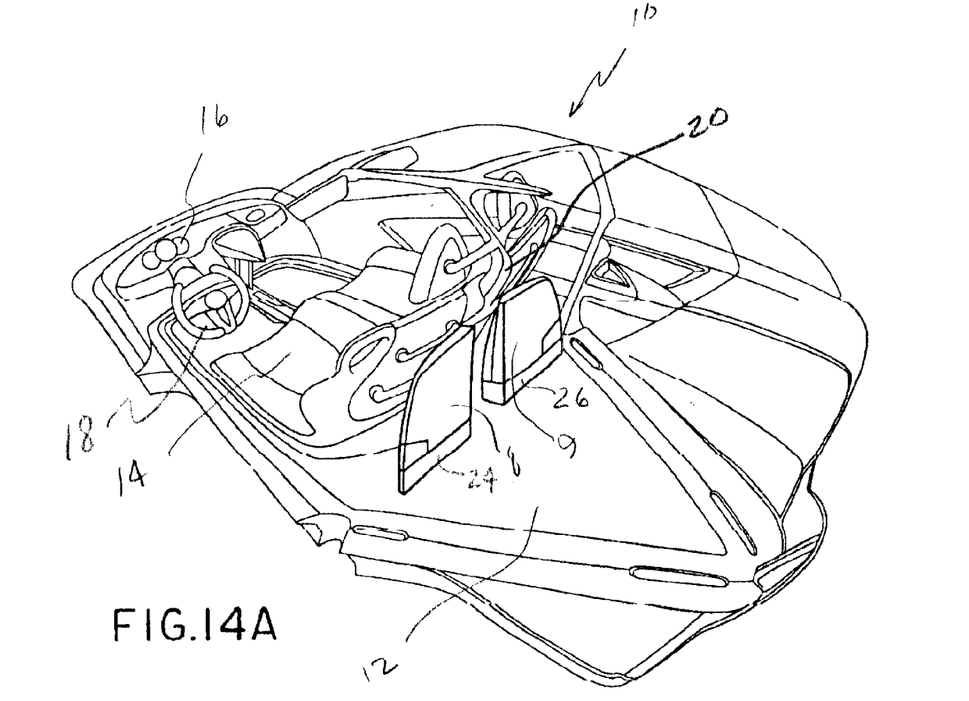
FIG. 14A illustrates the seats in the second folded state, behind the front seats.
Figure 14B:
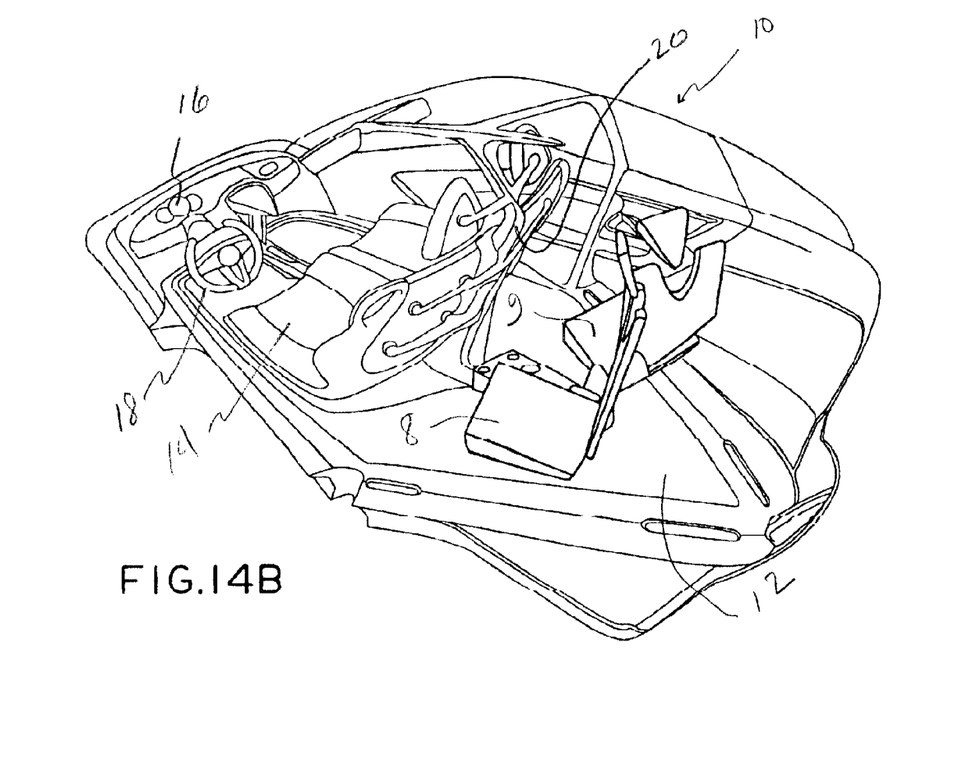
FIG. 14B illustrates the seats in the open state.
Figure 14C:
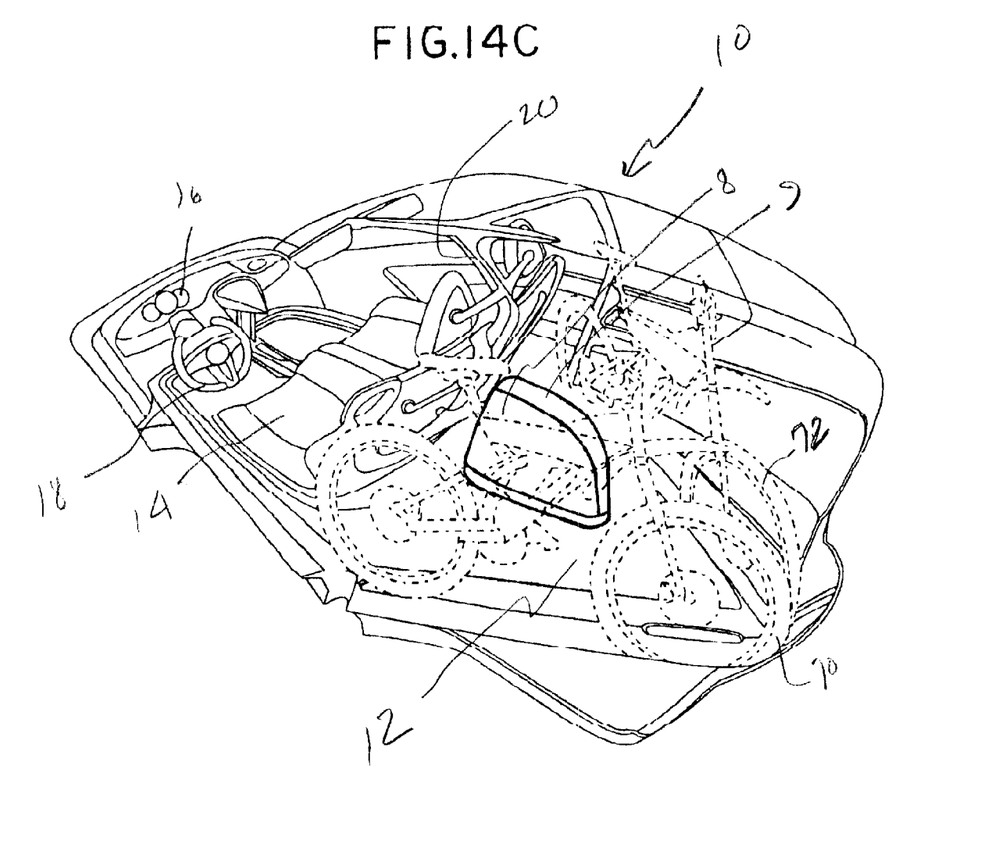
FIG. 14C illustrates the seats in the first folded state.

FIGS. 14A, 14B and 14C illustrate the different states of the foldable rear seats in accordance with the instant invention. Generally, vehicle 10 of FIG. 14A includes a vehicle floor 12, front seats 14, instrument cluster 16, steering wheel 18 and central pillar 20. In FIG. 14A, seats 8 and 9 are positioned in the second folded state (or butterfly position), in which they are stowed latterly with respect to the centerline of the vehicle. Left and right seats 8 and 9 have been pivoted outwardly from their central positions to a lateral position. Seats 8 and 9 pivot about pivot pins 23a and 23b connecting support stub 22 with left and right elongated support arms 24 and 26. In this second folded state, seats 8 and 9 are positioned generally behind front seat 14 in order to provide a large open space behind the front seats for bulky cargo.

FIG. 14B illustrates the open state of seats 8 and 9 in which they are open for use as seats. As illustrated in FIG. 14B, seats 8 and 9 are positioned so that they are angled slightly outwardly from the centerline of the vehicle so that the passenger's view is directed generally to the outside of the vehicle in order to provide a less claustrophobic feeling for the passengers in the rear seats.

FIG. 14C illustrates seats 8 and 9 configured in the first folded state (central stowage position), in which seats 8 and 9 folded up into a vertical orientation in a clam-shell mode, and generally oriented along a centerline of the vehicle. In the first folded state, it is possible to store longer objects or cargoes behind the front seats, for example, bicycles 70 and 72 (shown in phantom) are able to be positioned one on each side seats 8 and 9 in the folded up, clam-shell mode. With this configuration, it is easy to insert bicycles 70 and 72 through the car doors and to remove them from the vehicle by way of a rear hatch.

Figure 15:
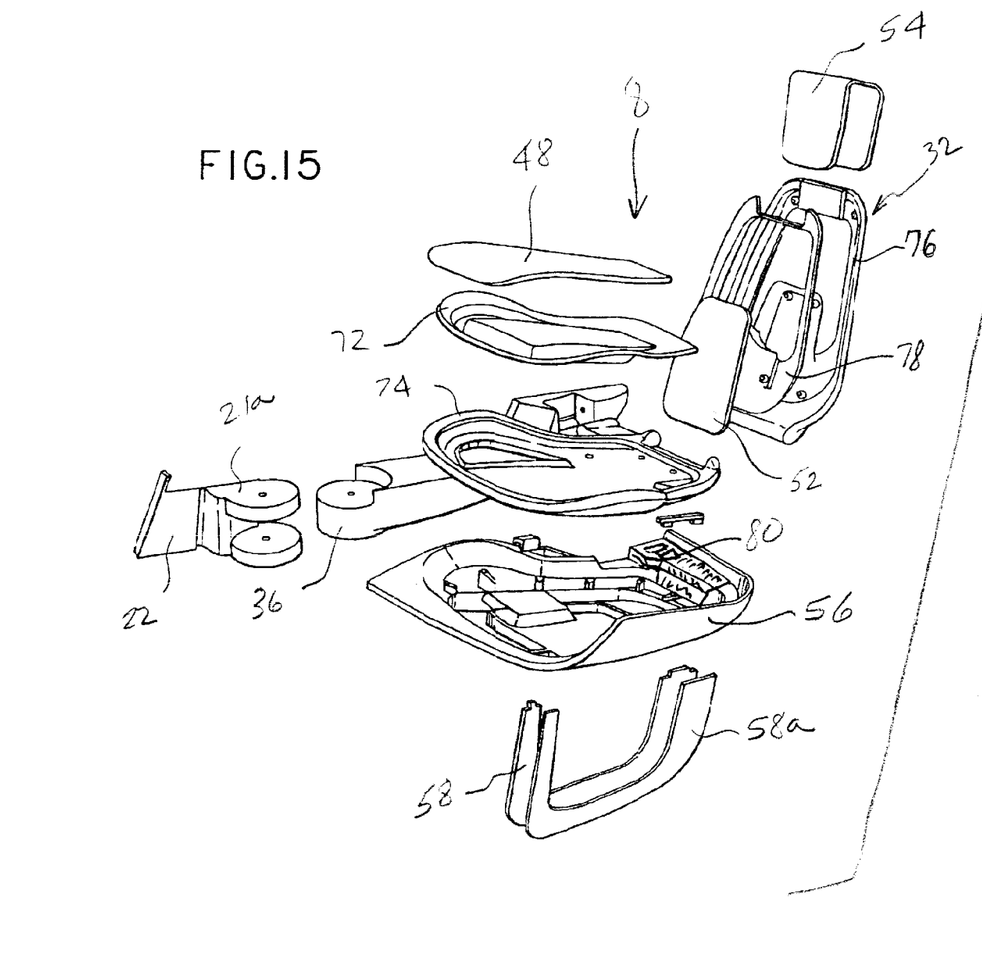
FIG. 15 is an exploded view of a seat in accordance with the instant invention.

FIG. 15 is an exploded view of left seat 8 illustrating the structure thereof. Left outer shell 56 supports lower seat pan 74, upper seat pan 72 and cushion layer 48. While not illustrated in FIG. 15, FIG. 1 illustrates mesh-like fabric 50 disposed between upper seat pan 72 and cushion layer 48. Seat leg 58 is attached to left outer shell 56. FIG. 15 illustrates a cover 58a attached to the outer of seat leg 58, for appearance purposes. Seat back 32 is formed of rear seat back frame 76 and seat back pan 78. Seat back cushion 52 is provided on top of the seat back pan 78, as with the seat bottom, FIG. 1 illustrates the use of mesh-like fabric 50 between seat back cushion 52 and seat back pan 78. Reference numeral 80 represents a lock, which releases seat back 32 and seat bottom 28 to pivot into their open position when the U-shaped seat leg 58 is pulled outwardly into its open position.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A foldable rear seat for a vehicle, comprising:
    a support stub fixed to the vehicle generally at a longitudinal centerline of the vehicle;
    an elongated support arm having a first end operatively connected to and pivotable about a vertical axis of said support stub and a second end remote from said first end;
    a seat bottom operatively connected to and pivotable about said second end of said support arm, such that said seat bottom is pivotable between a vertical folded position and a horizontal open position; and
    a seat back operatively connected to said seat bottom and pivotable about an axis at a rear portion of said seat bottom in order to fold into said seat bottom from an open position,
    whereby said rear seat is configurable into an open state for use as a seat and two folded states, a first folded state in which said seat is stowed in position generally along the centerline of the vehicle and a second folded state stowed laterally with respect to the centerline of the vehicle.

2. The foldable rear seat of claim 1, further comprising a seat leg pivotally connected with said seat bottom at an outer portion thereof, such that when said seat is in the open state, said seat leg extends between said seat bottom and the vehicle floor in order to support said seat bottom.

3. The foldable rear seat of claim 1, wherein said seat bottom includes an outer shell and an inner cushion.

4. The foldable rear seat of claim 3, wherein said seat leg is U-shaped, having a bight and opposing support legs, wherein with each opposing support leg thereof is pivotally attached to said outer shell of said seat bottom, such that said bight of the U-shaped leg rests on the vehicle floor in said open state.

5. The foldable rear seat of claim 4, further comprising a lock operatively connected with said seat bottom and said seat leg, such that when said seat leg is moved from a stowed position, said seat back and said seat bottom are released to also move into place for the open state.

6. The foldable rear seat of claim 1, wherein said seat back includes a headrest slideable upwardly and downwardly from a top of said seat back.

7. The foldable rear seat of claim 3, wherein said inner cushion includes a lower seat pan attached to said shell, an upper seat pan attached to said lower seat pan, a layer of mesh-like fabric covering said upper seat pan, and a cushion layer on top of a portion of said mesh-like fabric.

8. The foldable rear seat of claim 1, wherein said seat back includes a rear seat back frame, a seat back pan fixed to said seat back frame, a mesh-like fabric covering said seat back pan and a seat back cushion on top of a portion of said mesh-like fabric.

9. The foldable rear seat of claim 1, wherein said seat bottom, in said open state, is angled outwardly with respect to a centerline of the vehicle.

10. A pair of foldable rear seats for a vehicle, comprising:
    a support stub fixed to the vehicle;
    left and right elongated support arms, each having a first end operatively connected to and pivotable about said support stub and a second end remote from said first end, wherein each of said arms is pivotable from a position generally parallel to a centerline of the vehicle to a position generally perpendicular to the vehicle centerline;
    left and right seat bottoms, each operatively connected to and pivotable about said second end of said respective left and right elongated support arms, said left and right seat bottoms pivotable between an open horizontal position and a folded vertical position;
    left and right seat backs, each operatively connected to and pivotable about an axis at a rear portion of said respective left and right seat bottoms, in order to fold into said respective left and right seat bottoms;
    whereby said rear seats are each individually configurable into an open state, for use as a seat, and two folded states, a first folded state in which said seat is stowed in a position generally parallel to the vehicle centerline and a second folded state in which said seat is stowed in position generally lateral to the vehicle centerline.

11. The pair of foldable rear seats of claim 10, further comprising a pair of seat legs, each one pivotally connected with each of said left and right seat bottoms, at respective outer portion thereof, such that when said seats are in the open state, each seat leg extends between said respective seat bottom and the vehicle floor in order to support said seat bottoms.

12. The pair of foldable rear seats of claim 10, wherein said seat bottoms each includes an outer shell and an inner cushion.

13. The pair of foldable rear seats of claim 12, wherein each of said seat legs is U-shaped, having a bight and opposing support legs, wherein with each opposing support leg thereof is pivotally attached to said outer shell of said respective seat bottom, such that said bight of each U-shaped leg rests on the vehicle floor in said open state.

14. The pair of foldable rear seats of claim 13, further comprising a lock operatively connected with each said seat bottom and each said seat leg, such that when each seat leg is moved from a stowed position, each seat back and each seat bottom are released to also move into place to the open state.

15. The pair of foldable rear seats of claim 10, wherein each seat back includes a headrest slideable upwardly and downwardly from a top of each seat back.

16. The pair of foldable rear seats of claim 12, wherein said inner cushion of each seat bottom includes a lower seat pan attached to said respective shell, an upper seat pan attached to said lower seat pan, a layer of mesh-like fabric covering said upper seat pan, and a cushion layer on top of a portion of said mesh-like fabric.

17. The pair of foldable rear seats of claim 10, wherein each said seat back includes a rear seat back frame, a seat back pan fixed to said seat back frame, a mesh-like fabric covering said seat back pan and a seat back cushion on top of a portion of said mesh-like fabric.

18. The pair of foldable rear seats of claim 10, wherein each said seat bottom, in said open state, is angled outwardly with respect to a centerline of the vehicle.

19. A pair of foldable rear seats for a motor vehicle, comprising:
- a support stub fixed to the vehicle;
- left and right elongated support arms, each having a first end operatively connected to and pivotable about said support stub and a second end remote from said first end, wherein each of said arms is pivotable from a position generally parallel to a centerline of the vehicle to a position generally perpendicular to the vehicle centerline;
- left and right seat bottoms, each operatively connected to and pivotable about said second end of said respective left and right elongated support arms, said left and right seat bottoms pivotable between an open horizontal position and a folded vertical position;
- left and right seat backs, each operatively connected to and pivotable about an axis at a rear portion of said respective left and right seat bottoms, in order to fold into said respective left and right seat bottoms, each seat back including a headrest slideable upwardly and downwardly from a top of each seat back; and
- a pair of seat legs, one each pivotally connected with each of said left and right seat bottoms, at respective outer portion thereof, such that when said seats are in the open state, each seat leg extends between said respective seat bottom and the vehicle floor in order to support said seat bottoms, wherein said seat bottoms each includes an outer shell and an inner cushion, and each of said seat legs is U-shaped, having a bight and opposing support legs, wherein with each opposing support leg thereof is pivotally attached to said outer shell of said respective seat bottom, such that said bight of each U-shaped leg rests on the vehicle floor in said open state,
- whereby said rear seats are each individually configurable into an open state, for use as a seat, and two folded states, a first folded state in which said seat is stowed in a position generally parallel to the vehicle centerline and a second folded state in which said seat is stowed in position generally lateral to the vehicle centerline.

20. A method of folding up, from an open state, a foldable rear seat of a vehicle, said foldable rear seat including,
- a seat bottom operatively connected to and pivotable about a support arm, said support arm pivotable about a vertical axis of a support stub near a longitudinal centerline of the vehicle, such that the seat bottom is pivotable between a vertical folded position and a horizontal open position, and
- a seat back operatively connected to said seat bottom and pivotable about an axis at a rear portion of said seat bottom in order to fold into said seat bottom from an open position, wherein said seat back includes a headrest slideable upwardly and downwardly from a top of said seat back,
- a seat leg pivotally connected with said seat bottom at an outer portion thereof, such that when said seat is in the open state, said seat leg extends between said seat bottom and the vehicle floor in order to support said seat bottom,
- wherein said method comprises the steps of:
  - sliding said headrest downwardly into a nesting position in said seat back;
  - folding said seat back into said seat bottom;
  - raising said seat bottom, including said seat back and headrest, into a vertical stowed position; and
  - pivoting said seat leg from its open position to a closed position adjacent said seat bottom.

21. A method of unfolding a folded rear seat of a vehicle, said foldable rear seat including,
- a seat bottom operatively connected to and pivotable about a support arm, said support arm pivotable about a vertical axis of a support stub near a longitudinal centerline of the vehicle, such that the seat bottom is pivotable between a vertical folded position and a horizontal open position; and
- a seat back operatively connected to said seat bottom and pivotable about an axis at a rear portion of said seat bottom in order to fold into said seat bottom from an open position, wherein said seat back includes a headrest slideable upwardly and downwardly from a top of said seat back,
- a seat leg pivotally connected with said seat bottom at an outer portion thereof, such that when said seat is in the open state, said seat leg extends between said seat bottom and the vehicle floor in order to support said seat bottom, said seat bottom, seat back and seat leg being in the closed or folded position,
- wherein said method comprises the steps of:
  - pivoting said seat leg outwardly into an open position;
  - pivoting said seat bottom from a vertical folded position to a horizontal open position;
  - pivoting said seat back from a horizontal position to a vertical position; and
  - sliding said headrest upwardly on said seat back from a nesting position to an extended position.

* * * * *